(12) United States Patent
Ohira et al.

(10) Patent No.: US 7,775,139 B2
(45) Date of Patent: Aug. 17, 2010

(54) STEERING WHEEL STRUCTURE

(75) Inventors: Hiroshi Ohira, Aichi-ken (JP); Yuji Tajiri, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 98 days.

(21) Appl. No.: 11/928,435

(22) Filed: Oct. 30, 2007

(65) Prior Publication Data

US 2008/0110292 A1 May 15, 2008

(30) Foreign Application Priority Data

Nov. 9, 2006 (JP) .............................. 2006-303964

(51) Int. Cl.
*B62D 1/04* (2006.01)
*B62D 1/06* (2006.01)

(52) U.S. Cl. .................. 74/558; 74/552; 74/558.5; 428/167; 428/172

(58) Field of Classification Search ................... 74/552, 74/558, 558.5; 29/894.1; 428/180, 166, 428/167
See application file for complete search history.

(56) References Cited

U.S. PATENT DOCUMENTS

| 2,121,963 A | * | 6/1938 | Goit | 74/558 |
| 5,042,318 A | * | 8/1991 | Franz | 74/558 |
| 2006/0228509 A1 | * | 10/2006 | Sher et al. | 428/40.1 |

FOREIGN PATENT DOCUMENTS

JP 9-207255 A 8/1997

* cited by examiner

*Primary Examiner*—Richard W Ridley
*Assistant Examiner*—Daniel Yabut
(74) *Attorney, Agent, or Firm*—Roberts Mlotkowski Safran & Cole, P.C.; Thomas W. Cole

(57) ABSTRACT

A steering wheel structure, comprising: an internal member provided inside a vehicle steering wheel; a covering member, adhered to a surface of the internal member and covering the internal member; a first concave-convex portion, provided at the surface of the internal member and disposed in a predetermined pattern thereon; and a second concave-convex portion, provided at surfaces of the first concave-convex portion, is provided.

3 Claims, 5 Drawing Sheets

FIG. 5

| Specification | (1) | (2) | (3) | (4) | (5) |
|---|---|---|---|---|---|
| Lattice pattern [μm] | none | 150 | 150 | 200 | 200 |
| Satin finish [μm] | none | none | 20 | none | 20 |
| Adhesive strength [N] | 76.0 | 97.4 | 119.5 | 105.5 | 153.5 |
| Lattice pattern texture effect | - | 21.4 ((2)-(1)) | - | 29.5 ((4)-(1)) | - |
| Satin finish texture effect | - | - | 22.1 ((3)-(2)) | - | 48.0 ((5)-(4)) |

STEERING WHEEL STRUCTURE

CROSS-REFERENCE TO RELATED APPLICATION

This application claims priority under 35 U.S.C. 119 from Japanese Patent Application No. 2006-303964, the disclosure of which is incorporated by reference herein.

BACKGROUND

1. Technical Field

The present invention relates to a steering wheel structure, with a covering member covering an internal member of a vehicle steering wheel structure.

2. Related Art

As a flocked sheet, coating adhesive to an ultra-fine concave-convex surface formed on the surface of a polyethylene sheet, and implanting short fibers into the adhesive is known (see Japanese Patent Application Laid-Open (JP-A) No. 9-207255, for example).

When this is being undertaken, since in this flocked sheet there is only one type of ultra-fine concave-convex surface formed on the surface of the polyethylene sheet, the adhesive strength of the short fibers to the polyethylene sheet is weak.

SUMMARY

In consideration of the above circumstances, an object of the present invention is to provide a steering wheel structure that enables the adhesive strength of a covering member to an internal member to be increased.

According to a first aspect of the invention, there is provided a steering wheel structure comprising: an internal member provided inside a vehicle steering wheel; a covering member, adhered to a surface of the internal member and covering the internal member; a first concave-convex portion, provided at the surface of the internal member and disposed in a predetermined pattern thereon; and a second concave-convex portion, provided at surfaces of the first concave-convex portion.

A second aspect of the invention is the steering wheel structure according of the first aspect, in which the first concave-convex portion is disposed in a lattice shape.

According to a third aspect of the invention, there is provided a steering wheel structure comprising: an internal member provided inside a vehicle steering wheel; a covering member, adhered to a surface of the internal member and covering the internal member; a first concave-convex portion, provided at the surface of the internal member; and a second concave-convex portion, provided at surfaces of the first concave-convex portion and disposed in a particular pattern.

A fourth aspect of the invention is the steering wheel structure according of the third aspect, in which at least one of convex portions and concave portions of the second concave-convex portion are arrayed substantially evenly.

In the steering wheel structure of the first aspect, there is an internal member provided inside the vehicle steering wheel, and a covering member is adhered to the surface of the internal member and covers the internal member.

In this case, not only is there a first concave-convex portion provided to the surface of the internal member, but there is also a second concave-convex portion provided to the surface of the first concave-convex portion. Therefore, the adhesive strength of the covering member to the internal member is enabled to be raised.

Furthermore, the first concave-convex portion is disposed in a predetermined pattern. Therefore, the adhesive strength of the covering member to the internal member may be made uniform.

In the steering wheel structure of the second aspect, the first concave-convex portion is disposed in a lattice shape. Therefore, it is possible to make the adhesive strength of the covering member to the internal member appropriately uniform.

In the steering wheel structure of the third aspect, there is an internal member provided within a vehicle steering wheel, and a covering member is adhered to the surface of the internal member and the covering member covers the internal member.

In this case, not only is a first concave-convex portion provided to the surface of the internal member, but a second concave-convex portion is also provided to the surface of the first concave-convex portion. Thereby, the adhesive strength of the covering member to the internal member is enabled to be raised.

Furthermore, the second concave-convex portion is disposed in a particular pattern. Thereby, it is possible to make the adhesive strength of the covering member to the internal member uniform.

In the steering wheel structure of the fourth aspect, at least one of the convex portions and the concave portions of the second concave-convex portion are provided evenly. Thereby, it is possible to make the adhesive strength of the covering member to the internal member appropriately uniform.

BRIEF DESCRIPTION OF THE DRAWINGS

An exemplary embodiment of the present invention will be described in detail based on the following figures, wherein:

FIG. 5 is a table showing the results of an experiment on the exemplary embodiment of the present invention.

DETAILED DESCRIPTION

Figure 2:
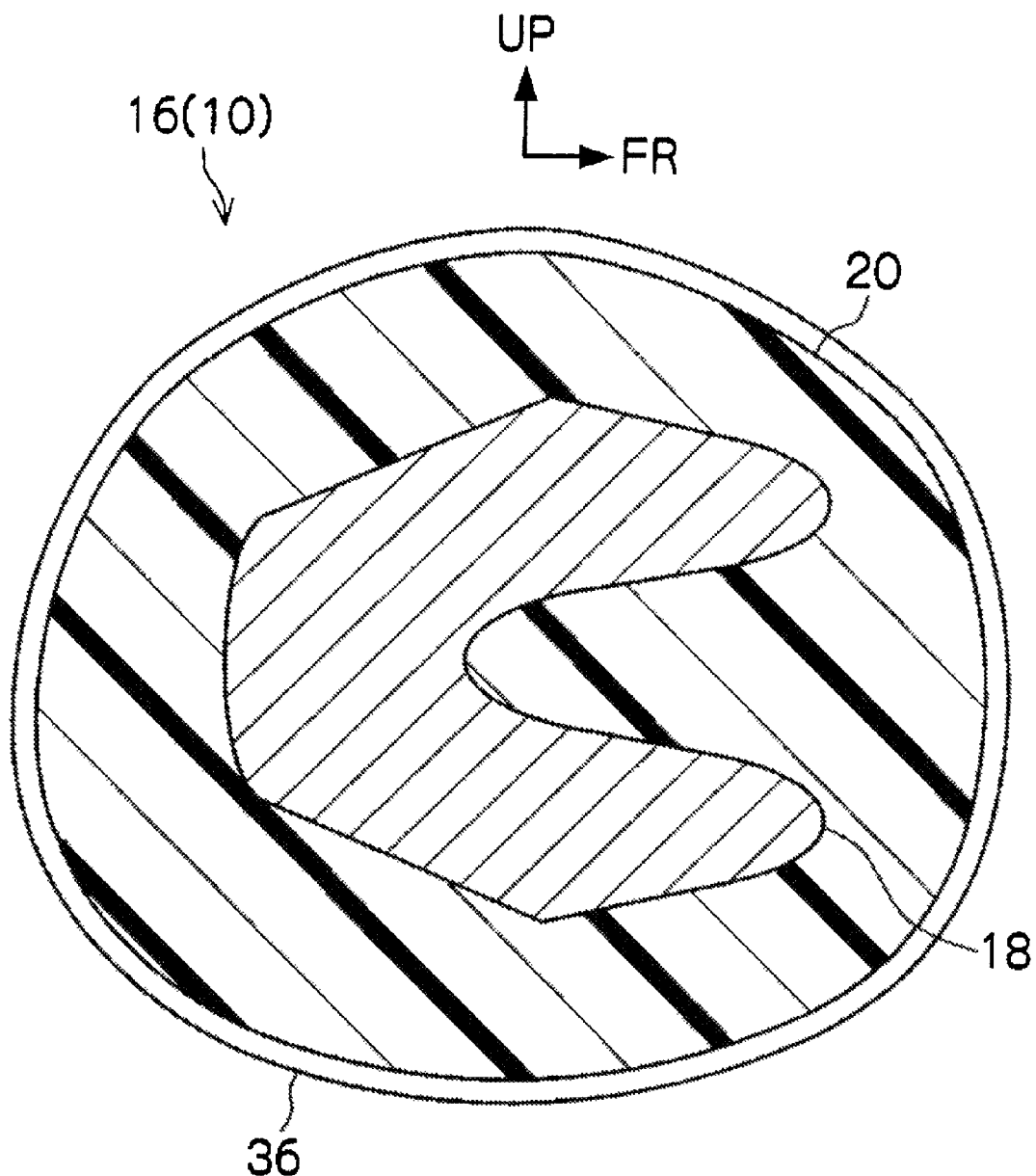
FIG. 2 is a cross-section (a cross-section taken on line 2-2 in FIG. 4), as viewed from the right side of the vehicle, showing the upper portion of the steering wheel according to the exemplary embodiment of the present invention.
Figure 4:
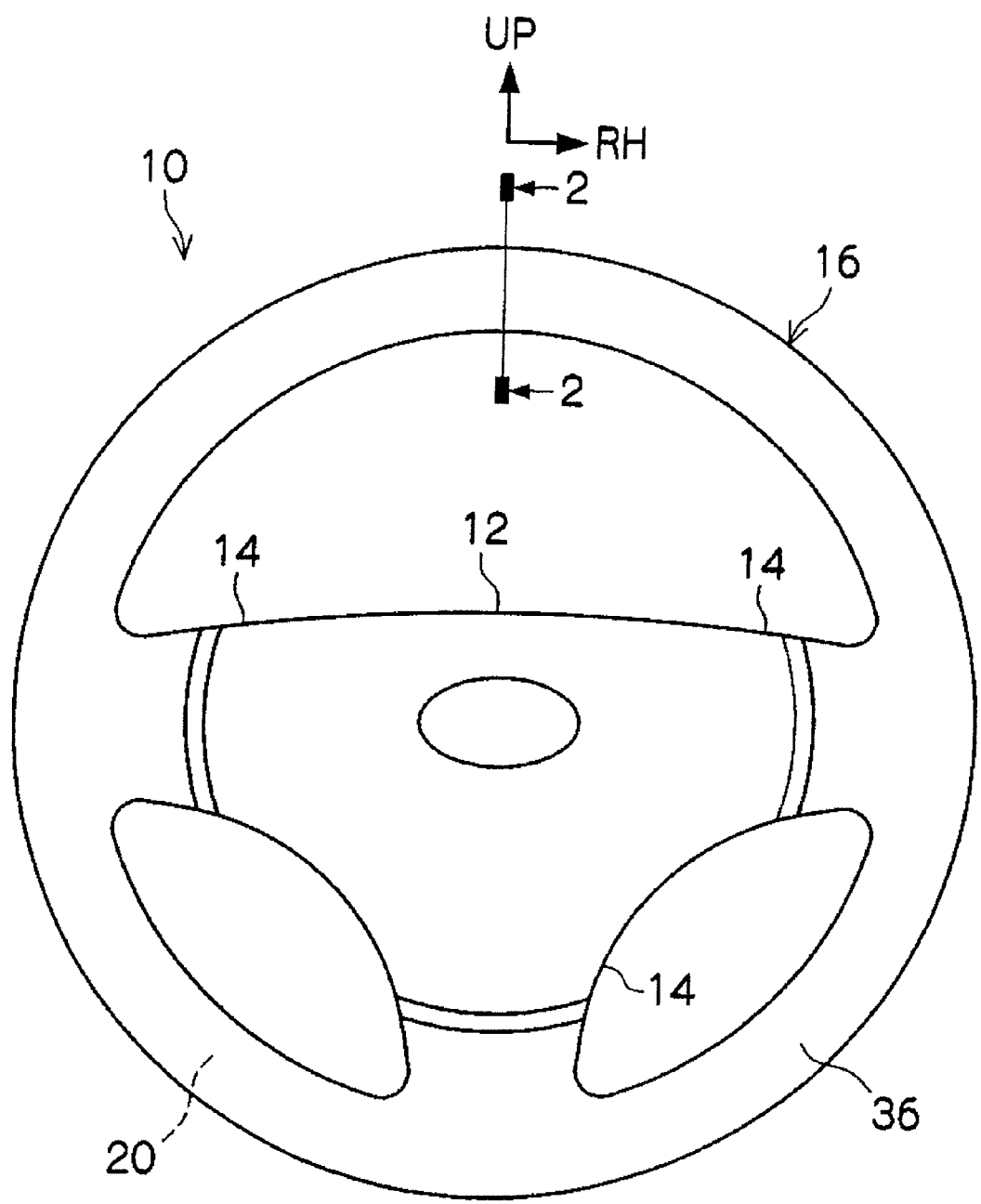
FIG. 4 is a front view, as seen from the rear side of the vehicle, showing the steering wheel according to the exemplary embodiment of the present invention.

FIG. 2 shows a cross-section (cross-section taken on line 2-2 in FIG. 4), as viewed from the right side of a vehicle, showing an upper portion of a steering wheel 10 according to an exemplary embodiment configured with the application of the steering wheel structure of the invention; FIG. 4 shows the steering wheel 10 in a front view from the rear side of the vehicle. It should be noted that in the figures, the vehicle front direction is shown by the arrow FR, the vehicle right direction is shown by the arrow RH, and the vehicle up direction is shown by the arrow UP.

There is a boss portion 12 provided to a central portion of the steering wheel 10 according to the present exemplary embodiment, and the top end (vehicle rear side) of an axial shaped steering shaft (not illustrated in the figures) is fixed to the boss portion 12. Base ends of a predetermined number (three in the present exemplary embodiment) of bar shaped spoke portions 14 are connected to the boss portion 12, and the predetermined number of spoke portions 14 extend out from the boss portion 12 toward the bottom of the vehicle, toward the vehicle right side and toward the vehicle left side, respectively.

The leading ends of the predetermined number of the spoke portions 14 are connected to a circular ring-shaped rim portion 16, and the axial center of the rim portion 16 matches the central axis of the steering shaft.

There is a core 18 provided as a core member at the center of the inside of the rim portion 16, the core 18 being a circular ring shape with a U-shaped cross-section, and the leading ends of the predetermined number of the spoke portions 14 are connected to the core 18.

An internal member 20, made of poly urethane in a circular ring shape, is formed around the outer periphery of the core 18, and the shape of the outer periphery of the internal member 20 is substantially circular in cross-section.

Figure 1:
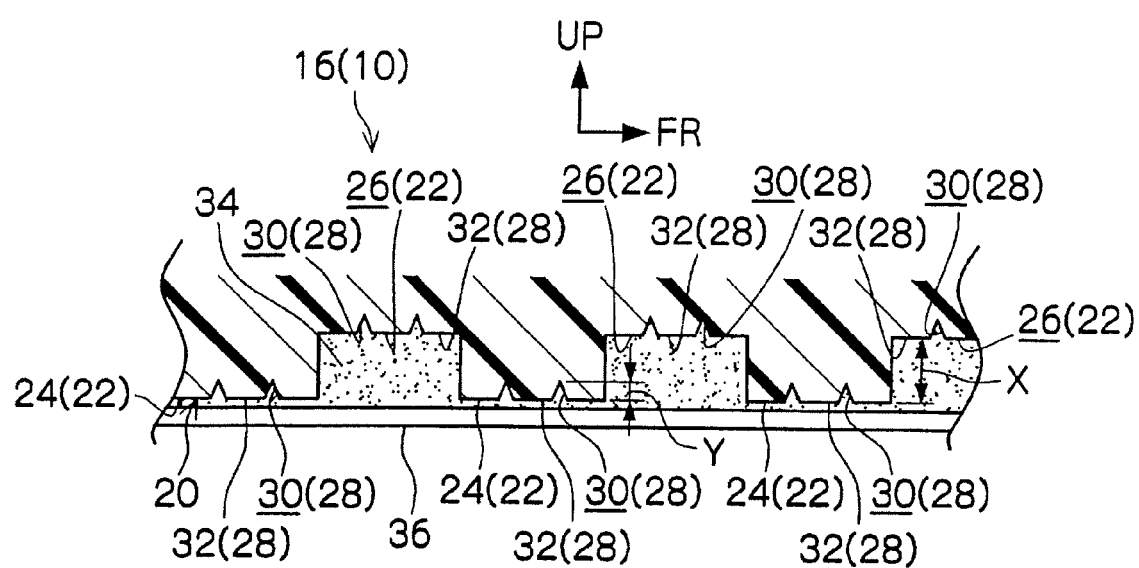
FIG. 1 is a cross-section, as viewed from the right side of a vehicle, showing the lower end part of an upper portion of a steering wheel according to an exemplary embodiment of the present invention.
Figure 3:
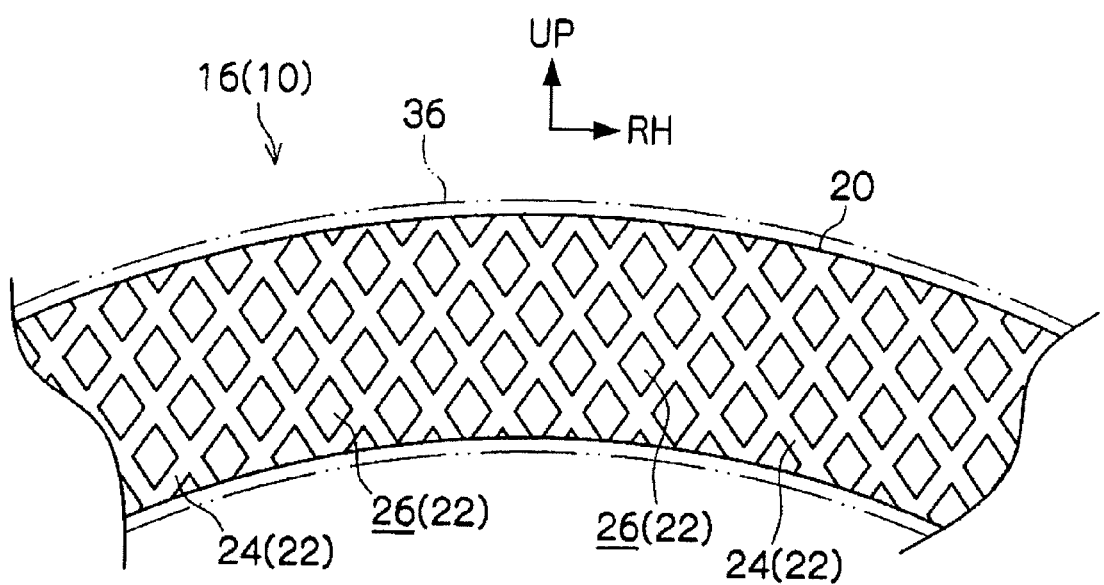
FIG. 3 is a front view, as seen from the rear side of the vehicle, showing the upper portion of the steering wheel according to the exemplary embodiment of the present invention.

As shown in FIG. 1 and FIG. 3, there is a lattice pattern texture 22, serving as a first concave-convex portion, formed over all of the surface of the internal member 20, and the lattice pattern texture 22 is provided with a uniform lattice pattern shape (predetermined pattern) with plural lattice convex portions 24, serving as first convex portions, having a band shape as viewed from the surface thereof and with a rectangular cross-section, disposed in a lattice shape with even intervals therebetween, and also with lattice concave portions 26, serving as first concave portions, having a diamond shape (trapezoidal shape) as viewed from the surface thereof and with a rectangular cross-section, disposed between the lattice convex portions 24. Furthermore, the depth X (see FIG. 1) of the lattice concave portions 26 is, for example, 200 µm (from 150 µm to 200 µm is suitable).

There is a satin finished texture 28, serving as a second concave-convex portion, formed over all of the surface of the internal member 20, the satin finished texture 28 having, on the surfaces of the lattice convex portions 24 and lattice concave portions 26, conically-shaped (cone-shaped and pillar-shaped are suitable) satin finished concave portions 30, serving as concave portions (second concave portions), uniformly disposed (at even intervals) (in a particular pattern), and, on portions that do not have the satin finished concave portions 30, are disposed satin finished convex portions 32, serving as convex portions (second convex portions). The depth Y of the satin finished concave portions 30 (see FIG. 1) is, for example, 20 µm.

A cow genuine leather surface skin 36 is bonded, as a covering member, to the whole of the surface of the internal member 20 by adhesive 34 (for example SOLVENT BASE, Trade Mark), and the surface skin 36 covers the internal member 20 (wraps around the internal member 20) and also configures the surface (decoration) of the rim portion 16. Furthermore, the adhesive 34 is disposed to the whole of the surface of the lattice convex portions 24 and the whole of the internal portions of the lattice concave portions 26 of the lattice pattern texture 22, and is disposed to the whole of the internal portions of the satin finished concave portions 30 and the whole of the surface of the satin finished convex portions 32 of the satin finished texture 28.

Explanation will now be given of the operation of the present exemplary embodiment.

In the rim portion 16 of the steering wheel 10 configured as above, the surface skin 36 is bonded to the surface of the internal member 20, and the surface skin 36 covers the internal member 20.

In this state, there is not only the lattice pattern texture 22 provided to the surface of the internal member 20, but also there is the satin finished texture 28 provided to the surface of the lattice pattern texture 22. The surface area of the internal member 20 in contact with the adhesive 34 is thereby made large, and also a so-called anchor effect (an effect in which the adhesive 34 bonds strongly to the satin finished concave portions 30) is generated by the satin finished concave portions 30 of the satin finished texture 28, and the adhesive strength of the surface skin 36 to the internal member 20 may be increased.

Also, the lattice pattern texture 22 is provided to the surface of the internal member 20 in a uniform lattice pattern shape, and also the satin finished concave portions 30 of the satin finished texture 28 are evenly provided on the surfaces of the lattice convex portions 24 and the lattice concave portions 26 of the lattice pattern texture 22. Thereby, the adhesive strength of the surface skin 36 to the internal member 20 may be made uniform.

Also, when the internal member 20 is formed, the lattice pattern texture 22 and the satin finished texture 28 are formed on the surface of the internal member 20 at the same time. The lattice pattern texture 22 and the satin finished texture 28 may therefore be easily formed on the surface of the internal member 20.

Furthermore, the depth X of the lattice concave portions 26 of the lattice pattern texture 22 is set to be 200 µm and the depth Y of the satin finished concave portions 30 of the satin finished texture 28 is set to be 20 µm. Thereby, the lattice pattern texture 22 and the satin finished texture 28 may be suppressed from becoming noticeable and disturbing with regard to the appearance and feel of the rim portion 16.

It should be noted that the present exemplary embodiment is configured with the lattice convex portions 24, having a band shape as viewed from the surface, disposed in a lattice shape in the lattice pattern texture 22, and with the lattice concave portions 26 disposed between the lattice convex portions 24, however, it may be configured with the lattice concave portions 26, having a band shape as viewed from the surface, disposed in a lattice shape in the lattice pattern texture 22, and the lattice convex portions 24 disposed between the lattice concave portions 26.

Also, the present exemplary embodiment is configured with the lattice pattern shaped lattice pattern texture 22 as the first concave-convex portion, but the first concave-convex portion may be configured as a striped texture in a striped pattern.

Furthermore, the present exemplary embodiment is configured with the satin finished concave portions 30 disposed in the satin finished texture 28, and with the satin finished convex portions 32 disposed to the portions other than the portions with the satin finished concave portions 30, however, it may be configured such that the cone-shaped or pillar-shaped satin finished convex portions 32 are disposed in the satin finished texture 28, with the satin finished concave portions 30 disposed to the portions other than the portions with the satin finished convex portions 32.

Also, the present exemplary embodiment is configured with the surface skin 36 bonded to the whole of the surface of the internal member 20, but is may be configured such that the surface skin 36 is bonded to a portion of the surface of the internal member 20.

EXAMPLE

In the present Example, the surface skin 36 that has been bonded to a portion in the circumferential direction of the internal member 20 is pulled in a direction that is tangential to the outer periphery of the internal member 20 at the bonded position of the surface skin 36, and the tensile load of the surface skin 36 is measured when the surface skin 36 separates from the internal member 20.

As shown in FIG. 5, in specification (1), when the internal member 20 does not have the lattice pattern texture 22 and does not have the satin finished texture 28 formed thereto, the tensile load of the surface skin 36 is 76.0 N.

In specification (2), when the internal member 20 does have the lattice pattern texture 22 formed thereto with a depth X of the lattice concave portions 26 of 150 μm but the satin finished texture 28 is not formed thereto, the tensile load of the surface skin 36 is 97.4 N. Therefore, due to the lattice pattern texture 22 with the lattice concave portions 26 having a depth X of 150 μm, an effect of 21.4 N (97.4 N-76.0 N) to the adhesive strength of the surface skin 36 to the internal member 20 is provided.

In specification (3), when the internal member 20 does have the lattice pattern texture 22 formed thereto with a depth X of the lattice concave portions 26 of 150 μm and also the satin finished texture 28 is formed thereto with a depth Y of the satin finished concave portions 30 of 20 μm, the tensile load of the surface skin 36 is 119.5 N. Therefore, due to the satin finished texture 28 with the satin finished concave portions 30 having a depth Y of 20 μm, an effect of 22.1 N (119.5 N-97.4 N) to the adhesive strength of the surface skin 36 to the internal member 20 is provided.

In specification (4), when the internal member 20 does have the lattice pattern texture 22 formed thereto with a depth X of the lattice concave portions 26 of 200 μm but the satin finished texture 28 is not formed thereto, the tensile load of the surface skin 36 is 105.5 N. Therefore, due to the lattice pattern texture 22 with the lattice concave portions 26 having a depth X of 200 μm, an effect of 29.5 N (105.5 N-76.0 N) to the adhesive strength of the surface skin 36 to the internal member 20 is provided.

In specification (5), when the internal member 20 does have the lattice pattern texture 22 formed thereto with a depth X of the lattice concave portions 26 of 200 μm and also the satin finished texture 28 is formed thereto with a depth Y of the satin finished concave portions 30 of 20 μm, the tensile load of the surface skin 36 is 153.5 N. Therefore, due to the satin finished texture 28 with the satin finished concave portions 30 having a depth Y of 20 μm, an effect of 48.0 N (153.5 N-105.5 N) to the adhesive strength of the surface skin 36 to the internal member 20 is provided.

It may be seen from the above that in specification (5) there is a multiplier effect from the lattice pattern texture 22 and the satin finished texture 28, to the adhesive strength of the surface skin 36 to the internal member 20, by having the lattice pattern texture 22 formed thereto with a depth X of the lattice concave portions 26 of 200 μm and by also having the satin finished texture 28 formed thereto with a depth Y of the satin finished concave portions 30 of 20 μm.

That is to say, when specification (2) and specification (3) are compared, the adhesive strength of the surface skin 36 to the internal member 20 is increased by 22.1 N due to the satin finished texture 28. However, when specification (4) and specification (5) are compared, the adhesive strength of the surface skin 36 to the internal member 20 is increased by 48.0 N due to the satin finished texture 28. It may be seen, therefore, that by not simply forming the satin finished texture 28 to the internal member 20, by but also forming the lattice pattern texture 22 with a depth X of the lattice concave portions 26 of 200 μm to the internal member 20, there is a multiplier effect from the lattice pattern texture 22 and the satin finished texture 28 to the adhesive strength of the surface skin 36 to the internal member 20.

What is claimed is:

1. A steering wheel structure comprising:
    an internal member provided inside a vehicle steering wheel;
    a covering member covering the internal member;
    a layer of adhesive material bonding the covering member to a surface of the internal member, and
    a first concave-convex portion provided at the surface of the internal member, and
    a second concave-convex portion provided at surfaces of the first concave-convex portion and disposed in a particular pattern, wherein a depth of said second concave portion is between about 10 and 15% a depth of said first concave portion and said first and second concave-convex portions function to substantially increase a strength of the adhesive bond between said internal member and said covering member, and
    wherein the first concave-convex portion is a lattice pattern texture with a plurality of lattice convex portions and lattice concave portions, and a depth of the lattice concave portions is set to be from 150 μm to 200 μm, and wherein the second concave-convex portion is a satin finished texture with a plurality of satin finished convex portions and satin finished concave portions, the satin finished concave portions being conically-shaped and having a depth of about 20 μm.

2. The steering wheel structure of claim 1, wherein at least one of convex portions and concave portions of the second concave-convex portion are provided evenly.

3. The steering wheel structure of claim 1, wherein the depth of the concave portions of the first convex-concave portion is about 200 μm.

* * * * *